US011939956B2

(12) United States Patent
Tovar

(10) Patent No.: US 11,939,956 B2
(45) Date of Patent: Mar. 26, 2024

(54) WIND TURBINE BLADE AND METHOD FOR DETECTING EMERGING DEFECTS

(71) Applicant: LM WIND POWER A/S, Kolding (DK)

(72) Inventor: Isaac Alejandro Martinez Tovar, Kolding (DK)

(73) Assignee: LM WIND POWER A/S, Kolding (DK)

( * ) Notice: Subject to any disclaimer, the term of this patent is extended or adjusted under 35 U.S.C. 154(b) by 184 days.

(21) Appl. No.: 17/616,717

(22) PCT Filed: Jul. 21, 2020

(86) PCT No.: PCT/EP2020/070568
§ 371 (c)(1),
(2) Date: Dec. 6, 2021

(87) PCT Pub. No.: WO2021/018671
PCT Pub. Date: Feb. 4, 2021

(65) Prior Publication Data
US 2022/0299013 A1   Sep. 22, 2022

(30) Foreign Application Priority Data

Jul. 26, 2019 (GB) ...................... 1910709

(51) Int. Cl.
*F03D 17/00* (2016.01)
*F03D 1/06* (2006.01)
(Continued)

(52) U.S. Cl.
CPC ........... *F03D 17/00* (2016.05); *F03D 1/0675* (2013.01); *G01N 29/12* (2013.01); *G01N 29/4436* (2013.01); *F05B 2260/80* (2013.01)

(58) Field of Classification Search
CPC ...... F03D 17/00; F03D 1/0675; F03D 1/0658; G01N 29/12; G01N 29/4436;
(Continued)

(56) References Cited

U.S. PATENT DOCUMENTS

| 6,076,405 A | 6/2000 | Schoess |
| 2006/0169046 A1 | 8/2006 | Gordon et al. |
| 2012/0253697 A1* | 10/2012 | Frankenstein ..... G05B 23/0254 |
| | | 702/39 |

FOREIGN PATENT DOCUMENTS

| CN | 107829887 A | 3/2018 |
| CN | 207660781 U | 7/2018 |

(Continued)

OTHER PUBLICATIONS

Raisutis, et al. "The Review of Non-Destructive Testing Techniques Suitable for Inspection of the Wind Turbine Blades"; Ultrasound; Jan. 2008.

*Primary Examiner* — Jacob M Amick
*Assistant Examiner* — Charles J Brauch
(74) *Attorney, Agent, or Firm* — Nath, Goldberg & Meyer; Jerald L. Meyer; Tanya E. Harkins

(57) ABSTRACT

Disclosed is a method for detecting concealed emerging defects in a structure of a wind turbine blade, and a wind turbine blade comprising a first acoustical transducer fastened to a first area of a surface of a structure of the wind turbine blade, and wherein the first acoustical transducer is configured to, while the wind turbine blade being attached to a hub of a wind turbine and the wind turbine is operating: emit a first primary acoustic signal through the surface of the structure and into the structure; and receive a first secondary acoustic signal indicative of an echo of the first primary acoustic signal.

22 Claims, 10 Drawing Sheets

(51) Int. Cl.
*G01N 29/12* (2006.01)
*G01N 29/44* (2006.01)

(58) Field of Classification Search
CPC ..... G01N 2291/0289; G01N 2291/044; G01N 2291/105; G01N 2291/2693; G01N 29/043; G01N 29/07; G01N 29/11; G01N 29/223; F05B 2260/80; F05B 2270/80; Y02E 10/72
See application file for complete search history.

(56) References Cited

FOREIGN PATENT DOCUMENTS

| | | |
|---|---|---|
| DE | 102012211566 A1 | 1/2014 |
| EP | 2933480 A1 | 10/2015 |
| GB | 2462078 A | 1/2010 |

* cited by examiner

WIND TURBINE BLADE AND METHOD FOR DETECTING EMERGING DEFECTS

This is a National Phase Application filed under 35 U.S.C. 371 as a national stage of PCT/EP2020/070568, filed Jul. 21, 2020, an application claiming the benefit of Great Britain Application No. 1910709.3, filed Jul. 26, 2019, the content of each of which is hereby incorporated by reference in its entirety.

The present disclosure relates to wind turbine blades and a method for detecting defects or potential failures, such as emerging failures of a wind turbine blade. In particular, the present disclosure relates detection and prevention of emerging failures in the wind turbine blade shell.

BACKGROUND

Formation and development of defects and weaknesses, e.g. cracks, in structures of a wind turbine, such as in a wind turbine blade, can be catastrophic if not detected early. For example, if cracks are forming near load bearing elements, such as around connection of bushings for fastening the wind turbine blade to the hub of the turbine, the entire blade may eventually detach from the hub, which obviously leads to a very dangerous situation, e.g. Involving a turbine collapse and/or loss of human life.

Defects and weaknesses may form due to applied load over time, and may originate from microscopic non-detectable imperfections and/or quality defects of subcomponents of the blade, which, e.g. because of the continuously applied load and/or re-distribution of loads to non-Intended interfaces, may develop and eventually lead to decreased mechanical strength of the affected part of the blade.

Regular inspections of the wind turbine and wind turbine blade may be conducted in an effort to identify such weaknesses early, and in good time before causing any mechanical complications or failures. However, defects and weaknesses may not be detectable by visual inspection, as they may form within structural parts, such as within the blade shell, e.g. embedded inside material of the blade shell. Therefore, ultrasound has been used in an effort to inspect the internal structure of the blade, such as inside the blade shells.

However, determination and detection of defects based on ultrasound measurements are largely dependent on experience and subjective judgement by the operator.

SUMMARY OF THE INVENTION

It is an object of the present disclosure to provide a wind turbine blade and a method for detecting an emerging risk of failure, which overcomes at least some of the disadvantages of the prior art.

Thus, the present disclosure relates to a method for detecting defects, such as concealed and/or emerging defects, in a structure, such as a structure of a wind turbine blade. The structure may be a root region, e.g. comprising a plurality of bushings.

The method comprises: fastening, e.g. gluing, a first acoustical transducer to a first area of a surface of the structure; attaching the wind turbine blade to a hub of a wind turbine; emitting by the first acoustical transducer a first primary acoustic signal through the surface of the structure and into the structure; and receiving by the first acoustical transducer a first secondary acoustic signal indicative of an echo of the first primary acoustic signal. The method further comprises: analysing the first secondary acoustic signal to obtain one or more first signal parameters; and evaluating presence of a first defect in the structure based on the one or more signal parameters.

The method may further comprise operating the wind turbine. Emitting by the first acoustical transducer the first primary acoustic signal and/or receiving by the first acoustical transducer the first secondary acoustic signal may be performed while operating the wind turbine.

Also disclosed is a wind turbine blade extending along a longitudinal axis from a root to a tip, the wind turbine blade comprising a root region, an airfoil region with the tip, the wind turbine blade comprising a pressure side, a suction side and a chord line extending between a leading edge and a trailing edge. The wind turbine blade comprises a first acoustical transducer fastened, e.g. glued, to a first area of a surface of a structure of the wind turbine blade, such as a root region of the wind turbine blade. The first acoustical transducer is configured to, e.g. while the wind turbine blade is attached to a hub of a wind turbine and/or while the wind turbine is operating: emit a first primary acoustic signal through the surface of the structure and into the structure; and receive a first secondary acoustic signal indicative of an echo of the first primary acoustic signal.

It is an advantage of the present disclosure that detection of imperfections may be automated, and subjective judgement of an operator may be reduced or eliminated. Furthermore, a history of measurements at the same point may be achieved, leading to an increased possibility of detecting emerging defects. Thereby, the likelihood of detecting emerging imperfections timely may be increased, and risk of failure of the wind turbine and wind turbine blade may be reduced.

It is a further advantage of the present disclosure, that the need for manual labour-intensive measurements may be reduced, thereby reducing costs associated with inspection of the wind turbine. Furthermore, the present disclosure allow inspection to occur while the wind turbine is in operation, thereby reducing or limiting the loss in production associated with temporarily halting the wind turbine for inspection.

Operating the wind turbine may comprise that the blades and the hub of the wind turbine is rotating and/or that the wind turbine is set to let the wind if any cause rotation of the blade and hub. Operating the wind turbine may comprise that the wind turbine is not halted.

It Is a further advantage of the present disclosure that measurements may be performed throughout the blade rotation cycle, for various positions of the blades and for varying mechanical loads, i.e. for different wind speed. Thereby, the likelihood of detecting an emerging defect is increased, as such defects may, in some circumstances, be detectable only when the blade is in certain positions.

The wind turbine blade may be equipped with a plurality of acoustical transducers and/or a plurality of wind turbine blades of the wind turbine may be equipped with one or more acoustical transducers.

The wind turbine blade may comprise a plurality of acoustical transducers including the first acoustical transducer and a second acoustical transducer, and optionally a third acoustical transducer. The method may comprise fastening, e.g. gluing, the plurality of acoustical transducers, including fastening the first acoustical transducer to the first area of the surface of the structure, fastening a second acoustical transducer to a second area of the surface of the structure, and/or fastening a third acoustical transducer to a third area of the surface of the structure. Each of the plurality of acoustical transducers may be fastened to a respective area of the surface of the root region.

While operating the wind turbine, the method may comprise emitting by the plurality of acoustical transducers primary acoustic signals, including the first primary acoustic signal and a second primary acoustic signal and optionally a third primary acoustic signal, through the surface of the structure and into the structure. The first primary acoustic signal may be emitted by the first acoustical transducer. The second primary acoustic signal may be emitted by the second acoustical transducer. The third primary acoustic signal may be emitted by the third acoustical transducer. The first acoustical transducer may be configured to, e.g. while the wind turbine blade is attached to a hub of a wind turbine and/or while the wind turbine is operating, emit the first primary acoustic signal. The second acoustical transducer may be configured to, e.g. while the wind turbine blade is attached to a hub of a wind turbine and/or while the wind turbine is operating, emit the second primary acoustic signal. The third acoustical transducer may be configured to, e.g. while the wind turbine blade is attached to a hub of a wind turbine and/or while the wind turbine is operating, emit the third primary acoustic signal.

While operating the wind turbine, the method may comprise receiving by the plurality of acoustical transducers secondary acoustic signals, including the first secondary acoustic signal and a second secondary acoustic signal and optionally a third secondary acoustic signal, indicative of echoes of the primary acoustic signals. The first secondary acoustic signal may be indicative of an echo of the first primary acoustic signal. The second secondary acoustic signal may be indicative of an echo of the second primary acoustic signal. The third secondary acoustic signal may be indicative of an echo of the third primary acoustic signal. The first secondary acoustic signal may be received by the first acoustical transducer. The second secondary acoustic signal may be received by the second acoustical transducer. The third secondary acoustic signal may be received by the third acoustical transducer. The first acoustical transducer may be configured to, e.g. while the wind turbine blade is attached to a hub of a wind turbine and/or while the wind turbine is operating, receive the first secondary acoustic signal. The second acoustical transducer may be configured to, e.g. while the wind turbine blade is attached to a hub of a wind turbine and/or while the wind turbine is operating, receive the second secondary acoustic signal. The third acoustical transducer may be configured to, e.g. while the wind turbine blade is attached to a hub of a wind turbine and/or while the wind turbine is operating, receive the third secondary acoustic signal.

The acoustical transducer(s), such as the first acoustical transducer, the second acoustical transducer, and/or the third acoustical transducer, may be ultrasound transducer(s). The acoustic signal(s), such as the primary acoustic signal, e.g. the first primary acoustic signal, the second primary acoustic signal, and/or the third primary acoustic signal, and/or the secondary acoustic signal, e.g. the first secondary acoustic signal, the second secondary acoustic signal, and/or the third secondary acoustic signal, may be ultrasound signal(s), e.g. having a frequency between 100 kHz and 1 MHz, such as between 300 kHz and 700 kHz, such as 500 kHz.

The secondary acoustic signal(s) may be analysed to obtain one or more signal parameters. The first secondary acoustic signal may be analysed to obtain one or more first signal parameters. The second secondary acoustic signal may be analysed to obtain one or more second signal parameters. The third secondary acoustic signal may be analysed to obtain one or more third signal parameters.

Presence of defects, such as the first defect, a second defect and/or a third defect, may be evaluated based on the one or more signal parameters. Presence of the first defect, e.g. being located along a first incident direction of the first acoustical transducer, may be evaluated based on the one or more first signal parameters. Presence of the second defect, e.g. being located along a second incident direction of the second acoustical transducer, may be evaluated based on the one or more second signal parameters. Presence of the third defect, e.g. being located along a third incident direction of the third acoustical transducer, may be evaluated based on the one or more third signal parameters.

The incident direction of an acoustical transducer, e.g. the direction of the sound beam of the acoustical transducer, may be a direction perpendicular to the area of the surface to which the respective acoustical transducer is fastened. For example, the first incident direction of the first acoustical transducer may be perpendicular to the first area, the second incident direction of the second acoustical transducer may be perpendicular to the second area, and/or the third incident direction of the third acoustical transducer may be perpendicular to the third area.

The structure may be a root region of the wind turbine blade, such as a root region comprising a plurality of embedded bushings configured for mechanically coupling the wind turbine blade to the hub of the wind turbine. The acoustical transducer(s), such as the first acoustical transducer, the second acoustical transducer and/or the third acoustical transducer may be positioned on the root region such that a respective bushing of the plurality of embedded bushings is located along a respective incident direction for the respective acoustical transducer. A first bushing of the plurality of bushings may be located along the first incident direction. A second bushing of the plurality of bushings may be located along the second incident direction. A third bushing of the plurality of bushings may be located along the third incident direction.

The wind turbine blade may comprise as many acoustical transducers as bushings, i.e. an acoustical transducer may be provided for each bushing of the plurality of bushings. Alternatively, the wind turbine blade may comprise less acoustical transducers than bushings, i.e. the number of the plurality of acoustical transducers may be less than the number of the plurality of embedded bushings. For example, the number of the plurality of acoustical transducers may be between 5 and 10. The number of the plurality of embedded bushings may be more than 50. The acoustical transducers may be positioned to monitor bushings that are subject to the highest load, e.g. obtained from computer simulations of the wind turbine. For example, the acoustical transducer(s) may be positioned to monitor one or more of the bushings subject to the highest compression load, and/or the acoustical transducers(s) may be positioned to monitor one or more of the bushings subject to the highest tensile load. One or more of the acoustical transducers, such as a majority of the plurality of acoustical transducers, may be fastened to the pressure side, e.g. at areas with the highest tension, of the wind turbine blade, e.g. the pressure side of the root region, such as near bushings located between 81-92 degrees measured from the trailing edge on the pressure side. Alternatively, the acoustical transducers may be distributed evenly throughout the surface of the structure, e.g. evenly around the root region.

One or more or all of the acoustical transducer(s) may be fastened to an outer surface of the structure, such as an outer surface of the root region. As defects may initially form on the outside of the bushing, positioning the acoustical transducer(s) on the outside surface is advantageous for early detection of the defects. Alternatively or additionally, one or more or all of the acoustical transducer(s) may be fastened to an inner surface of the structure, such as an inner surface of the root region. For example, in positions where defects may initially form on the inside of the bushing, positioning the acoustical transducer(s) on the inside surface may be advantageous for early detection of the defects.

After determining the presence of one or more defects, the operation of the wind turbine may be halted. In some situations, a limited number of defects may be acceptable, and the wind turbine may be halted if the number of determined defects exceeds a set threshold. For example, in accordance with determined defects being more than or equal to a threshold number of defects halting operation of the wind turbine, and in accordance with the determined defects being less than the threshold number of defects continue operation of the wind turbine. The threshold number of defects may be two or more.

The wind turbine blade may comprise a wireless transmitter configured to wirelessly transmit wireless signal(s) indicative of the secondary acoustic signal(s) to a wireless receiver. The wireless receiver may be provided in the nacelle of the wind turbine or on the ground. Thereby, wiring of the acoustical transducers may be reduced, and installation of the blade may be significantly simplified. Furthermore, risk of wires being damaged is eliminated or at least reduced. Wireless coupling is particularly advantageous in the present concept because the acoustical transducers are to be installed on a wind turbine blade, which will be rotating.

The wind turbine blade may comprise a processing unit. The processing unit may be configured to receive one or more transducer signal(s) indicative of the secondary acoustic signal(s). The processing unit may be configured to forward the transducer signal(s) to the wireless transmitter and/or cause the wireless transmitter to wirelessly transmit the wireless signal(s) to the wireless receiver.

The wind turbine blade may comprise a battery. The battery may be configured to power the transducer(s), the wireless transmitter, and/or the processing unit.

An acoustical transducer, such as the first acoustical transducer, the second acoustical transducer and/or the third acoustical transducer may be provided as part of a respective transducer unit optionally comprising also a wireless transmitter, a processing unit and/or a battery, as described above. For example, a first transducer unit may comprise the first acoustical transducer, a first wireless transducer, a first battery and/or a first processing unit. A second transducer unit may comprise the second acoustical transducer, a second wireless transducer, a second battery and/or a second processing unit. A third transducer unit may comprise the third acoustical transducer, a third wireless transducer, a third battery and/or a third processing unit. The transducer unit(s) may comprise a housing, e.g. to protect the internal elements, such as the acoustical transducer, from rain, snow, wind etc.

Analysing the secondary acoustic signal(s) and/or evaluating presence of one or more defects may be provided by a processing unit located remotely from the wind turbine blade, e.g. In the nacelle, on the ground, or at a remote location from the wind turbine. For example, analysing the secondary acoustic signal(s) and/or evaluating presence of one or more defects may be provided by a cloud server.

Analysing the secondary acoustic signal(s), such as the first secondary acoustic signal, the second secondary acoustic signal and/or the third secondary acoustic signal may be performed while the wind turbine is operating. Evaluating presence of defects, such as the first defect, the second defect and/or the third defect, in the structure may performed while the wind turbine is operating.

Monitoring to detect defects may be performed repeatedly and/or continuously, e.g. emitting the first primary acoustic signal, receiving the first secondary acoustic signal, analysing the secondary acoustic signal and/or evaluating presence of defects in the structure may be repeatedly performed, e.g. separated by a first time difference. The first time difference may be between 1 second and 72 hours. For example, the first time difference may be between 10-600 seconds, such as between 30-300 seconds, such as between 60-100 seconds. Alternatively, the first time difference may be between 12 hours and 72 hours, such as between 12 hours and 48 hours, such as between 12 hours and 36 hours, such as 24 hours. In particular, it may be beneficial to reduce the frequency of measurements in cases where the transducer is battery powered.

The wind turbine may be a fixed speed wind turbine, e.g. operating at a substantially constant rotational speed, i.e. rated speed, regardless of the wind speed. Alternatively, the wind turbine may be a variable speed wind turbine, e.g. operating within a range of rated rotational speeds, e.g. depending on the wind speed. The time it takes the hub and the blades to rotate one full revolution, e.g. at rated speed or within limits of rated speed, or at an average speed within limits of rated speed, may be denoted a full rotation time. The first time difference may be selected such that the first time difference is not divisible by the full rotation time, e.g. such as to provide measurements on the wind turbine blade at different positions in the rotation cycle.

Reference measurements may be performed, e.g. prior to providing measurements specifically for detecting defects. For example, the method may comprise, e.g. prior to operating the wind turbine or while operating the wind turbine for one or more initial cycles, such as an initial plurality of cycles, emitting by the acoustical transducer(s) initial primary acoustic signal(s) through the surface of the structure and into the structure; and receiving by the acoustical transducer(s) initial secondary acoustic signal(s) indicative of echo(es) of the initial primary acoustic signal(s). An initial first primary acoustic signal may be emitted by the first acoustical transducer and an initial first secondary acoustic signal indicative of an echo of the initial first primary acoustic signal may be received by the first acoustical transducer. An initial second primary acoustic signal may be emitted by the second acoustical transducer and an initial second secondary acoustic signal indicative of an echo of the initial second primary acoustic signal may be received by the second acoustical transducer. An initial third primary acoustic signal may be emitted by the third acoustical transducer and an initial third secondary acoustic signal indicative of an echo of the initial third primary acoustic signal may be received by the third acoustical transducer.

The method may comprise determining reference measurement(s), such as a first reference measurement, a second reference measurement and/or a third reference measurement, based on the initial secondary acoustic signal(s). A first reference measurement, e.g. for the first acoustical transducer, may be determined based on one or more initial first secondary acoustic signals. A second reference measurement, e.g. for the second acoustical transducer, may be determined based on one or more initial second secondary acoustic signals. A third reference measurement, e.g. for the third acoustical transducer, may be determined based on one or more initial third secondary acoustic signals.

As mentioned above, presence of defects, such as the first defect, the second defect and/or the third defect, may be evaluated based on the one or more signal parameters, e.g. the one or more first signal parameters, the one or more second signal parameters, and/or the one or more third signal parameters.

The one or more signal parameters may comprise a primary signal parameter, a secondary signal parameter, a tertiary signal parameter, a quaternary signal parameter and/or a quinary signal parameter. The one or more first signal parameters may comprise a first primary signal parameter, a first secondary signal parameter, a first tertiary signal parameter, a first quaternary signal parameter and/or a first quinary signal parameter. The one or more second signal parameters may comprise a second primary signal parameter, a second secondary signal parameter, a second tertiary signal parameter, a second quaternary signal parameter and/or a second quinary signal parameter. The one or more third signal parameters may comprise a third primary signal parameter, a third secondary signal parameter, a third tertiary signal parameter, a third quaternary signal parameter and/or a third quinary signal parameter.

The primary signal parameter(s) may be indicative of a dissimilarity between the secondary acoustic signal(s) and a reference signal, such as the initial secondary acoustic signal(s) or an empirically established reference signal. For example, the first primary signal parameter may be indicative of a dissimilarity between the first secondary acoustic signal and the initial first secondary acoustic signal. Alternatively or additionally, the second primary signal parameter may be indicative of a dissimilarity between the second secondary acoustic signal and the initial second secondary acoustic signal. Alternatively or additionally, the third primary signal parameter may be indicative of a dissimilarity between the third secondary acoustic signal and the initial third secondary acoustic signal. The primary signal parameter, such as the first primary signal parameter, the second primary signal parameter and/or the third primary signal parameter, may be obtained by calculating cross-correlation between the secondary acoustic signal and the respective initial secondary acoustic signal with zero displacement:

$\int_0^T f(t)g(t)dt$ where f(t) is the initial secondary acoustic signal and g(t) the secondary acoustic signal, and T is the total time of the measured signal, and comparing to an expected value, e.g. obtained by calculating a cross correlation of the initial secondary acoustic signal and itself with zero delay:

$\int_0^T f(t)f(t)dt$

If the difference of the calculated cross-correlation between the secondary acoustic signal and the respective initial secondary acoustic signal differs from the expected value, e.g. more than a trained and/or predetermined threshold, it may be determined that a defect is emerging. Alternatively, the calculated cross-correlation between the secondary acoustic signal and the respective initial secondary acoustic signal may be compared to an expected confidence interval, e.g. a 95% confidence interval, of cross-correlations between reference signals from different transducers, controlled experiments and/or on different blades.

The secondary signal parameter(s) may be indicative of a peak amplitude of the secondary acoustic signal(s) within a secondary time frame, such as a predefined secondary time frame. For example, the first secondary signal parameter may be indicative of a peak amplitude of the first secondary acoustic signal within a first secondary time frame, such as a predefined first secondary time frame. Alternatively or additionally, the second secondary signal parameter may be indicative of a peak amplitude of the second secondary acoustic signal within a second secondary time frame, such as a predefined second secondary time frame. Alternatively or additionally, the third secondary signal parameter may be indicative of a peak amplitude of the third secondary acoustic signal within a third secondary time frame, such as a predefined third secondary time frame. The secondary time frame, such as the first secondary time frame, the second secondary time frame and/or the third secondary time frame, may be from a detected reflection known to be originating from the surface of the structure, such as between 4-10 micro-seconds.

The tertiary signal parameter(s) may be indicative of a similarity between a reference waveform and a detected reflection within a tertiary time frame, such as a predefined tertiary time frame. For example, the first tertiary signal parameter may be indicative of a similarity between the reference waveform and a detected first reflection within a first tertiary time frame, such as a predefined first tertiary time frame. Alternatively or additionally, the second tertiary signal parameter may be indicative of a similarity between the reference waveform and a detected second reflection within a second tertiary time frame, such as a predefined second tertiary time frame. Alternatively or additionally, the third tertiary signal parameter may be indicative of a similarity between the reference waveform and a detected third reflection within a third tertiary time frame, such as a predefined third tertiary time frame. The tertiary time frame, such as the first tertiary time frame, the second tertiary time frame and/or the third tertiary time frame, may be from a detected reflection known to be originating from the surface of the structure, such as between 4-10 micro-seconds.

The reference waveform may be modelled based on transducer characteristics and/or material characteristics of the structure. The reference waveform may be resembling the signal shape of an echo of the pulse emitted by the transducer in the material of the structure. The reference waveform may be modelled based on a detected reflection known to be originating from the surface of the structure. The reference waveform may be modelled based on:

$$RefP(t) = A \cdot \left(\frac{1}{\sqrt{\pi \cdot \sigma^2}}\right) \cdot e^{-\frac{1}{2 \cdot \sigma^2}(t-\mu)^2} \cdot \cos(2 \cdot \pi \cdot f \cdot t + \emptyset)$$

The reference waveform may also be used to identify the time of the reflection known to be originating from the surface of the structure.

The quaternary signal parameter(s) may be indicative of the time of a peak amplitude within a quaternary time frame, such as a predefined quaternary time frame. For example, the first quaternary signal parameter may be indicative of the time of a first peak amplitude within a first quaternary time frame, such as a predefined first quaternary time frame. Alternatively or additionally, the second quaternary signal parameter may be indicative of the time of a second peak amplitude within a second quaternary time frame, such as a predefined second quaternary time frame. Alternatively or additionally, the third quaternary signal parameter may be indicative of the time of a third peak amplitude within a third quaternary time frame, such as a predefined third quaternary time frame. The quaternary time frame, such as the first quaternary time frame, the second quaternary time frame and/or the third quaternary time frame, may be from the detected reflection known to be originating from the surface of the structure, such as between 4-10 micro-seconds.

The quinary signal parameter(s) may be indicative of the time of a detected occurrence of a reference waveform, such as the reference waveform as described with respect to the tertiary signal parameter(s), within a quinary time frame, such as a predefined quinary time frame. For example, the first quinary signal parameter may be indicative of the time of a first detected occurrence of the reference waveform within a first quinary time frame, such as a predefined first quinary time frame. Alternatively or additionally, the second quinary signal parameter may be indicative of the time of a second detected occurrence of the reference waveform within a second quinary time frame, such as a predefined second quinary time frame. Alternatively or additionally, the third quinary signal parameter may be indicative of the time of a third detected occurrence of the reference waveform within a third quinary time frame, such as a predefined third quinary time frame. The quinary time frame, such as the first quinary time frame, the second quinary time frame and/or the third quinary time frame, may be from the detected reflection known to be originating from the surface of the structure, such as between 4-10 micro-seconds.

For example, a cost function cost(τ) may be calculated by computing a cross-correlation between the secondary acoustic signal and the reference waveform for different values of delay τ:

$$\text{Cost}(\tau) = \int_0^T \text{RefP}(t) g(t+\tau) dt$$

where RefP(t) is the reference waveform signal and g(t) the secondary acoustic signal, and T is the total time of the reference signal. Arguments of the maxima of the cost function (detected delay), e.g. outside a predefined threshold, may be indicative of a defect, such as a time within the signal of an occurrence of the reference waveform. For example, the quinary signal parameter may be based on a comparison of the delay between the secondary acoustic signal and the reference waveform and an expected delay calculated between a reference signal and the reference waveform.

The one or more signal parameter(s), such as the primary signal parameter, the secondary signal parameter, the tertiary signal parameter, the quaternary signal parameter and/or the quinary signal parameter may be used individually or in a suitable combination, to increase the likelihood of detecting emerging defects and reduce the likelihood of false positives.

Presence of defects in the reference measurement(s), such as in the first reference measurement, the second reference measurement and/or the third reference measurement, and/ or in the initial secondary acoustic signal(s), such as in the first initial secondary acoustic signal(s), the second initial secondary acoustic signal(s) and/or the third initial secondary acoustic signal(s), may be evaluated based on one or more of the one or more signal parameters, e.g. to verify that no defects are present in the reference measurement.

Although the present disclosure is mainly focused towards detecting emerging risks near the root end of the blade, the method and the principles as described herein may be applied alternatively or additionally to other structures of a wind turbine blade.

Although the present disclosure is mainly focused towards detecting emerging risks in a structure of a wind turbine blade, the method and the principles as described herein may be applied similarly to structures of other constructions.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Uke reference numerals refer to like elements throughout. Uke elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
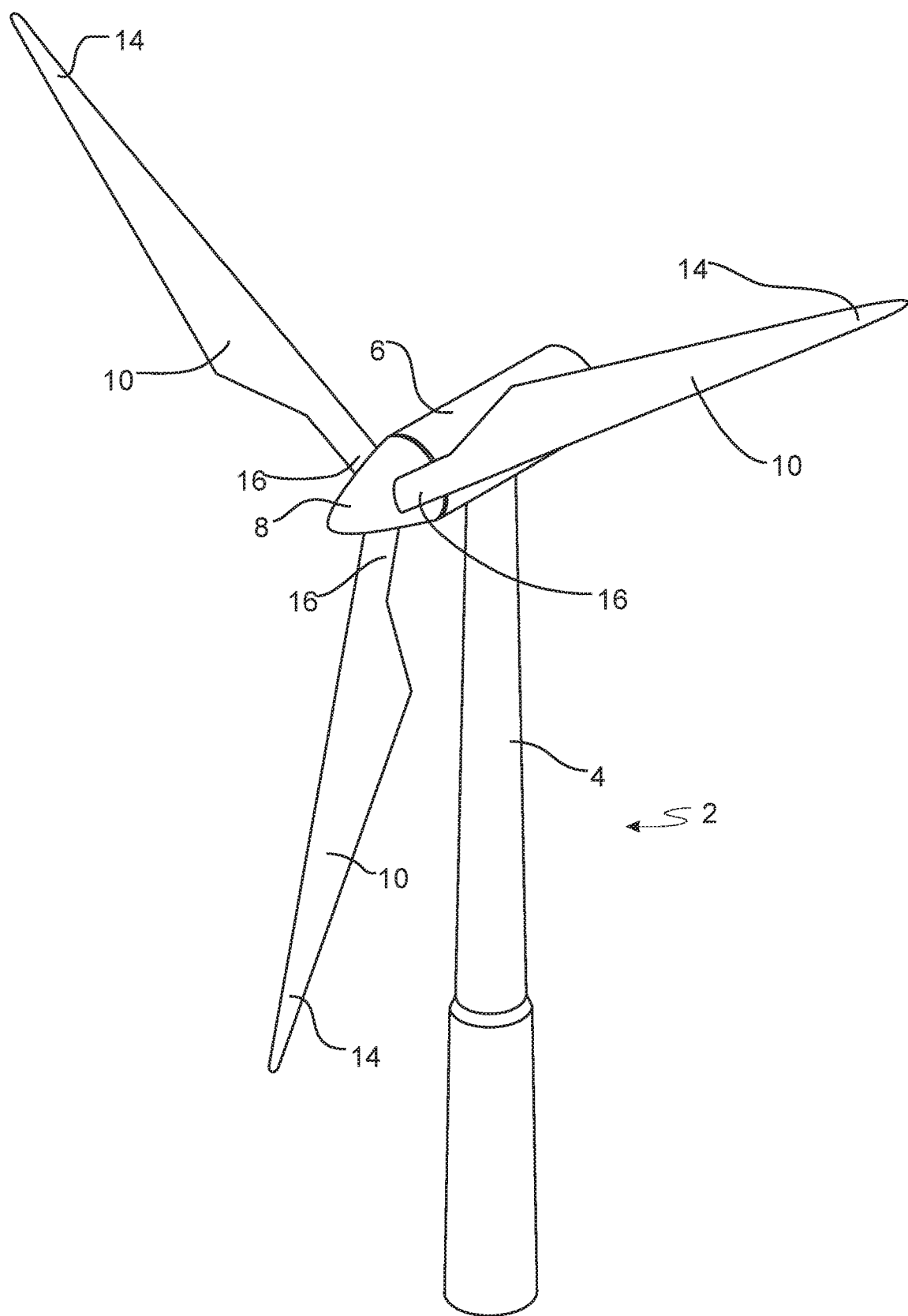
FIG. 1 schematically illustrates an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

When the wind turbine 2 is operating, the hub and the blades 10 rotates around the rotor shaft. The wind turbine 2 may be a fixed speed wind turbine, which operates substantially at the same rotational speed, i.e. rated speed. Alternatively, the wind turbine 2 may be a variable speed wind turbine, which operates within a range of rated rotational speeds, e.g. depending on the wind speed. When operating, e.g. at the rated speed or within the limits of rated rotational speed, the time it takes the hub 8 and the blades 10 to rotate one full revolution may be denoted a full rotation time.

Figure 2:
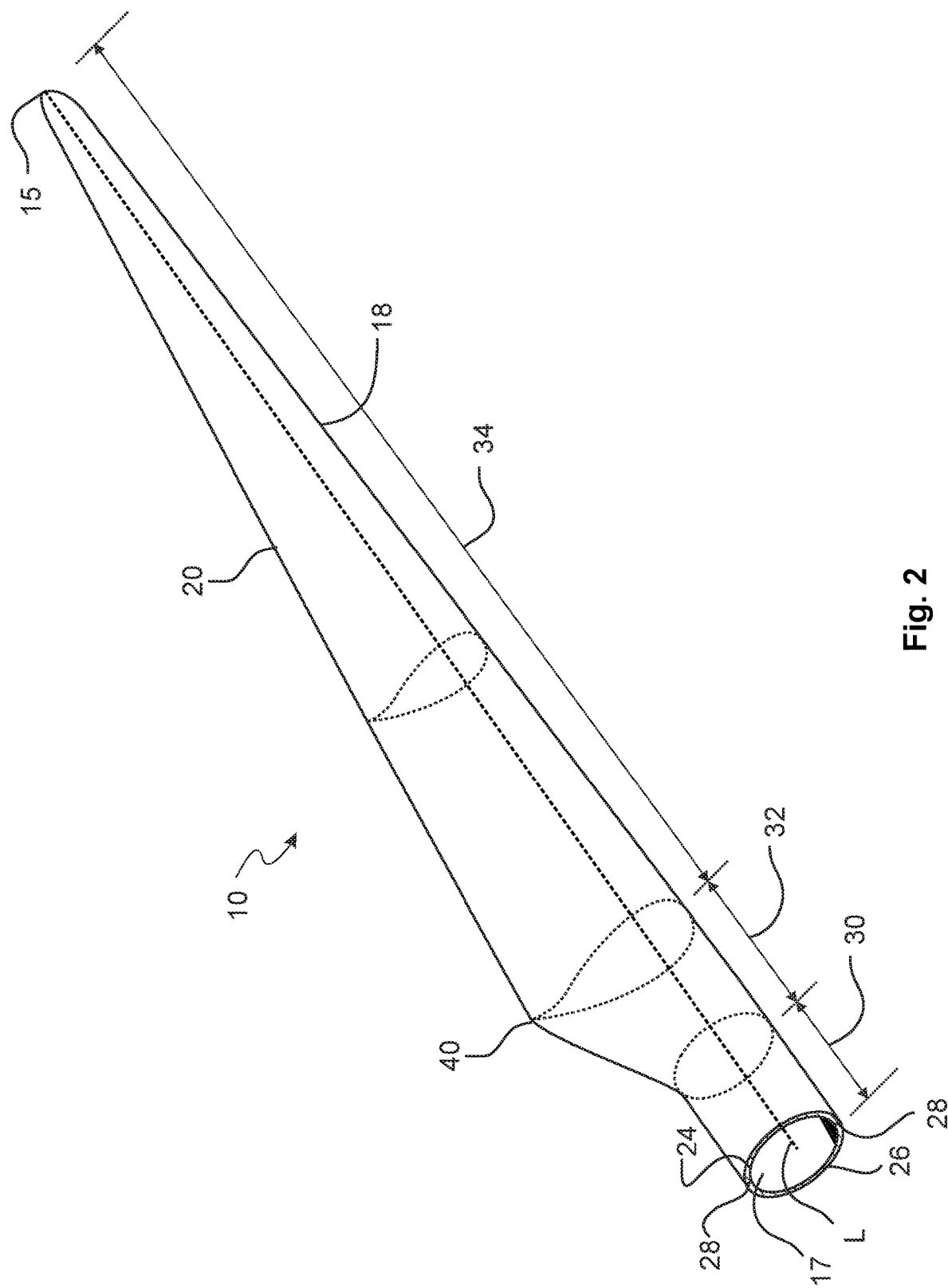
FIG. 2 schematically illustrates an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part.

The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3:
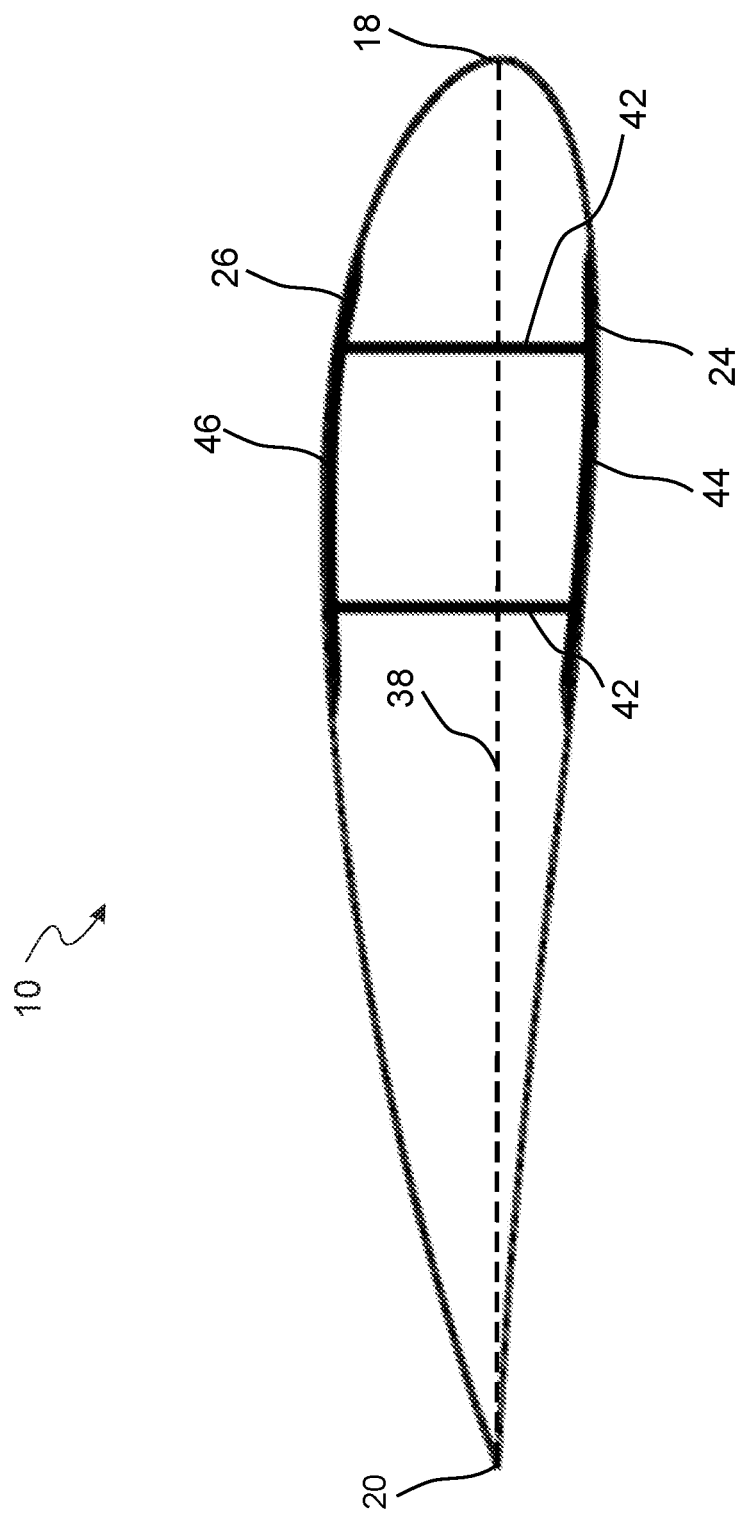
FIG. 3 schematically illustrates a cross sectional view of an exemplary wind turbine blade, FIG. 4 schematically illustrates an exemplary root region of a wind turbine blade, FIG. 5 schematically illustrates an exemplary root region of a wind turbine blade, FIGS. 6a-c schematically illustrates measurements with an exemplary acoustical transducer, FIGS. 7a-c schematically illustrates measurements with an exemplary acoustical transducer.

FIG. 3 is a schematic diagram illustrating a cross sectional view of an exemplary wind turbine blade 10, e.g. a cross-sectional view of the airfoil region of the wind turbine blade 10. The wind turbine blade 10 comprises a leading edge 18, a trailing edge 20, a pressure side 24, a suction side 26 a first spar cap 44, and a second spar cap 46. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The spar caps 44, 46 may comprise carbon fibres while the rest of the shell parts 24, 26 may comprise glass fibres.

Figure 4:
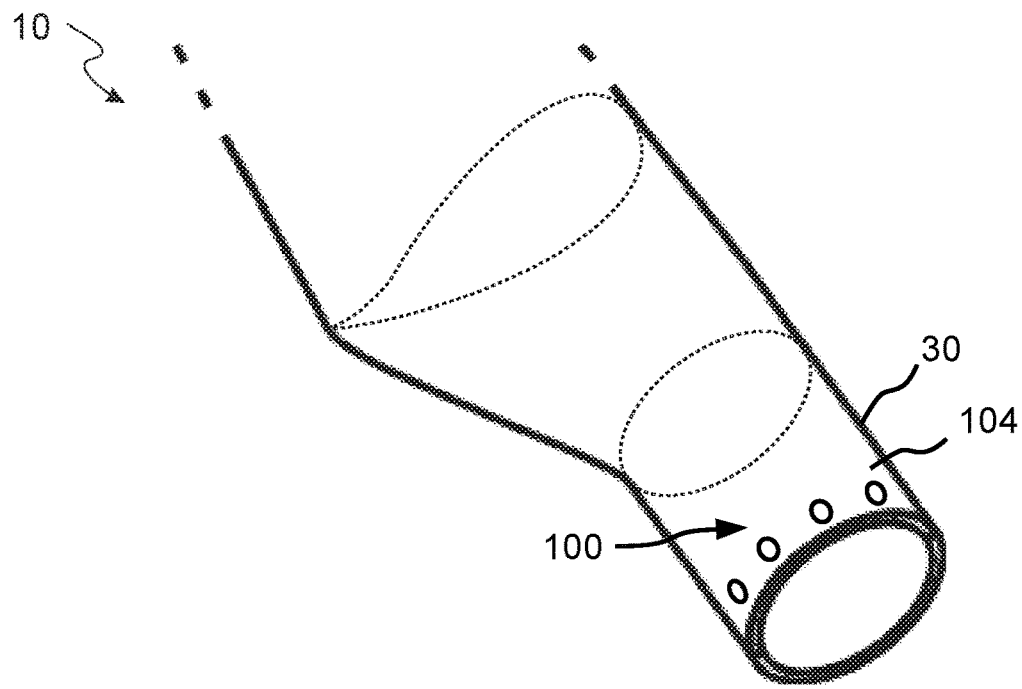

FIG. 4 is a schematic diagram illustrating a root region 30 of a wind turbine blade 10, such as the wind turbine blade as described in earlier figures. The wind turbine blade 10 comprises acoustical transducers 100, e.g. Including a first acoustical transducer, a second acoustical transducer, etc., fastened to a surface 104 of the root region 30, such as the outside surface as illustrated. The acoustical transducers are configured to provide measurements to detect concealed defects in the root region 30, e.g. while the wind turbine blade is attached to a hub of a wind turbine and the wind turbine is operating.

Figure 5:
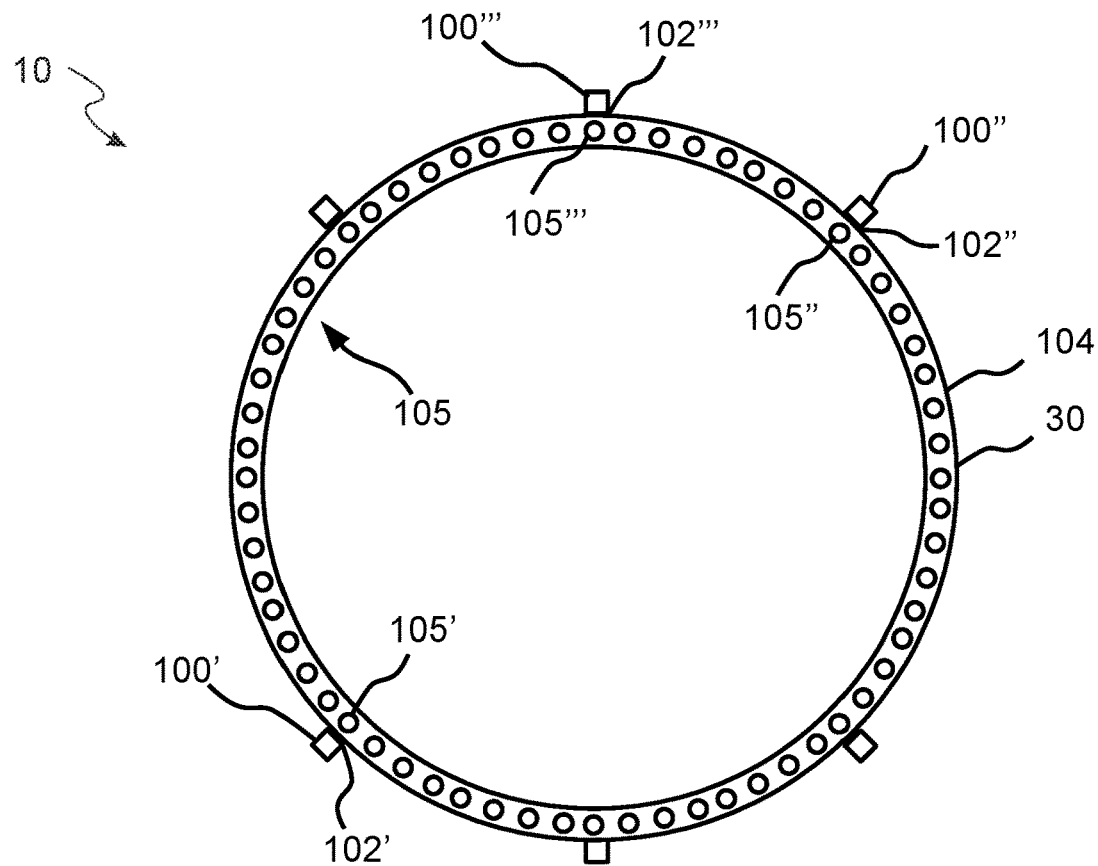

FIG. 5 is a schematic diagram illustrating an end view of a root region 30 of a wind turbine blade 10, such as the wind turbine blade as described in earlier figures.

The root region 30 comprises a plurality of embedded bushings 105. The bushings 105 are configured to mechanically couple the wind turbine blade 10 to the hub 8 of the wind turbine 2 (see FIG. 1).

Acoustical transducers 100 are fastened to the surface 104 the root region. For illustrative purposes a first acoustical transducer 100', a second acoustical transducer 100" and a third acoustical transducer 100''' are denoted. However, as also illustrated the wind turbine blade 10 may comprise other numbers of acoustical transducers. The acoustical transducers 100 are fastened to respective areas 102 of the surface 104 of the root region. For example, the first acoustical transducer 100' is fastened to a first area 102' of the surface 104, the second acoustical transducer 100" is fastened to a second area 102" of the surface 104, and the third acoustical transducer 100''' is fastened to a third area 102''' of the surface 104. A respective bushing of the plurality of bushings 105 is located underneath each of the respective areas 102 of which an acoustical transducer 100 is fastened. For example, a first bushing 105' is located underneath the first area 102', a second bushing 105" is located underneath the second area 102", and a third bushing 105''' is located underneath the third area 102'''. Each of the acoustical transducers 100 may be configured to provide measurements to detect concealed defects, such as cracks, in the vicinity of the respective bushing, such as at material interfaces, such as between the bushing 105 and surrounding composite material.

Figure 6:
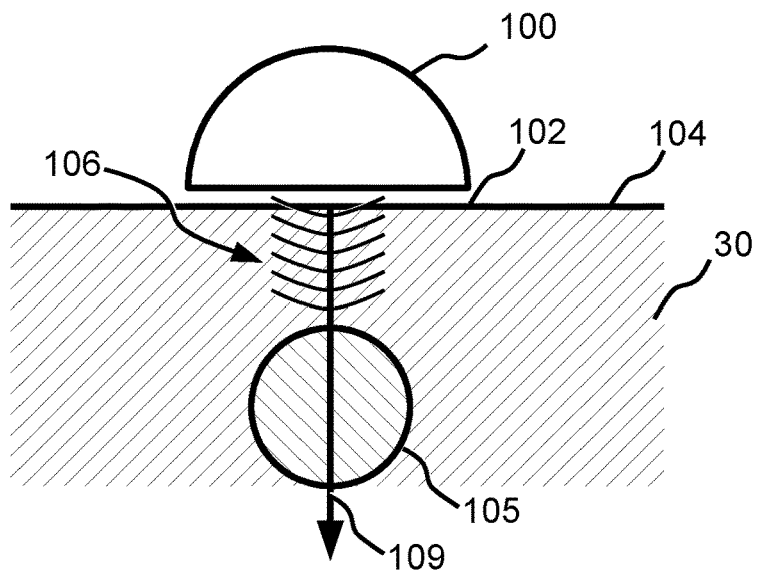
Figure 6:
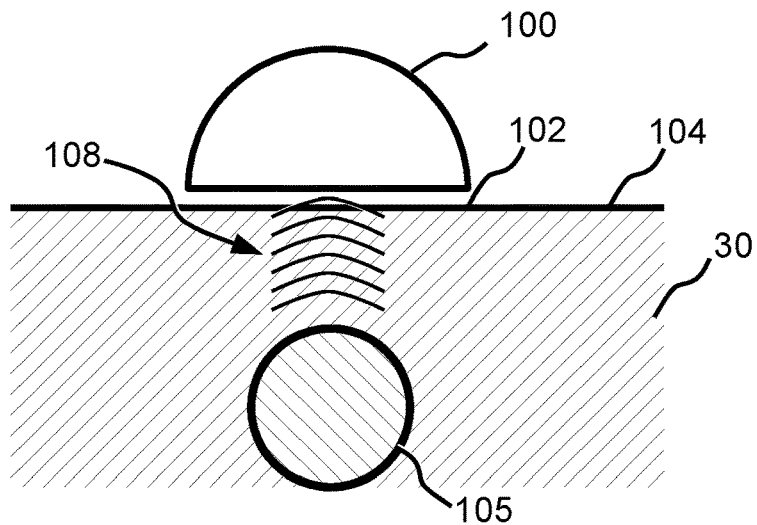
Figure 6:
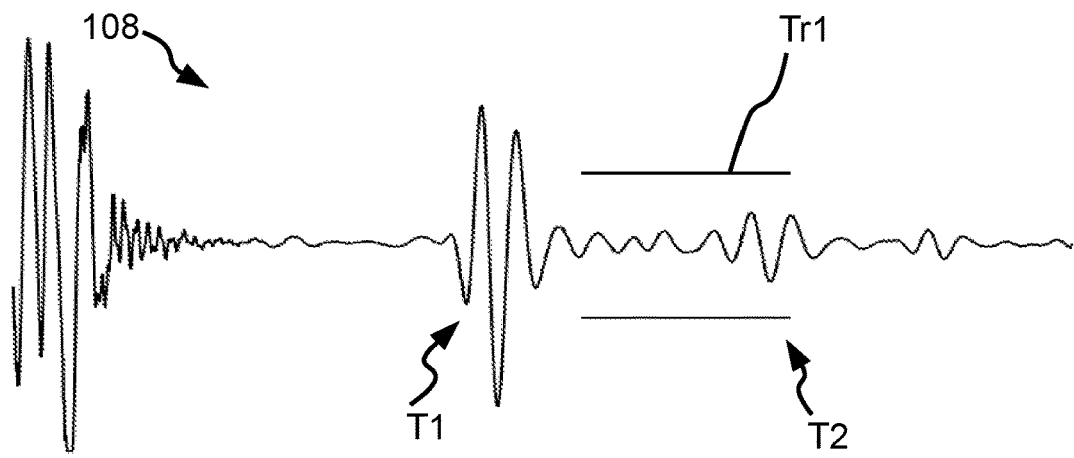

FIGS. 6a-b schematically illustrates a cross sectional view of an acoustical transducer 100 fastened to an area 102 of a surface 104 of a structure, such as the root region 30 as exemplified with respect to previous figures. Also, the presence of a bushing 105 in the root region 30 is illustrated. The bushing 105 is located underneath the area 102 on which the acoustical transducer 100 is fastened, more specifically, the bushing is located along an incident direction 109 perpendicular to the area 102.

As Illustrated in FIG. 6a, the acoustical transducer 100 emits a primary acoustic signal 106, e.g. along the incident direction 109, through the surface 104 of the root region 30 and into the root region 30. The internal structure of the root region 30 will, at least partly, reflect the primary acoustic signal 106 and return an echo in the form of a secondary acoustic signal 108, as illustrated in FIG. 6b. The acoustical transducer 100 receives the secondary acoustic signal 108.

FIG. 6c, shows a schematic illustration of a temporal representation of the secondary acoustic signal 108 received by the acoustical transducer 100 in the situation illustrated in FIGS. 6a-b. The secondary acoustic signal 108 as illustrated in FIG. 6c, shows at T1 an initial echo originating from the transition between the acoustical transducer 100 and the root region 30. Furthermore, at T2 an echo is seen at T2 caused by the material transition between the material of the root region 30 and the bushing 105. As also illustrated, in this situation, the peak amplitude of the echo caused by the transition between the root region material and the bushing 105 is less than the illustrated first amplitude threshold Tr1.

Figure 7:
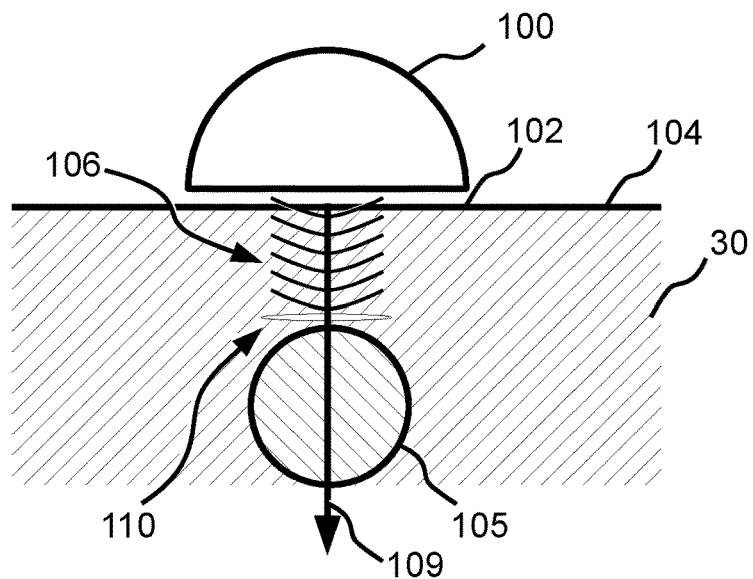
Figure 7:
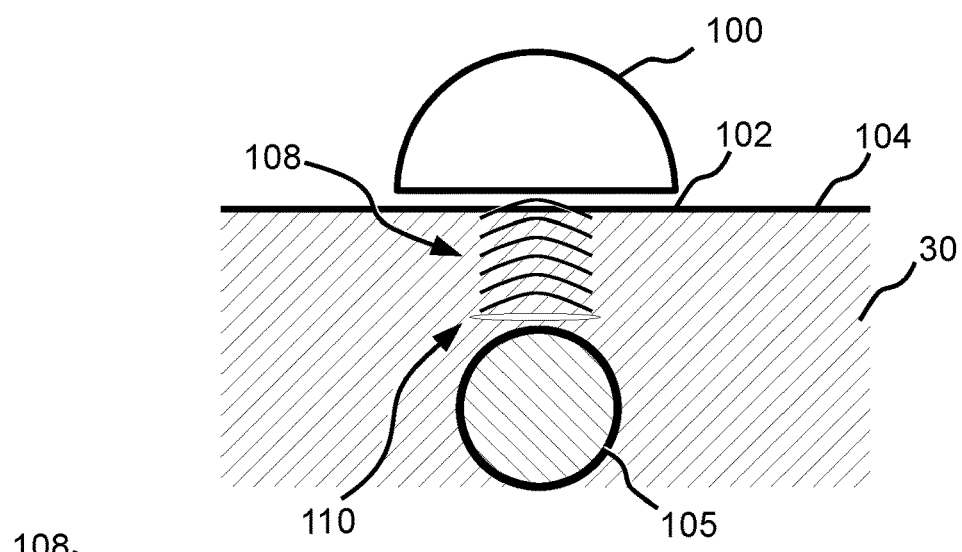
Figure 7:
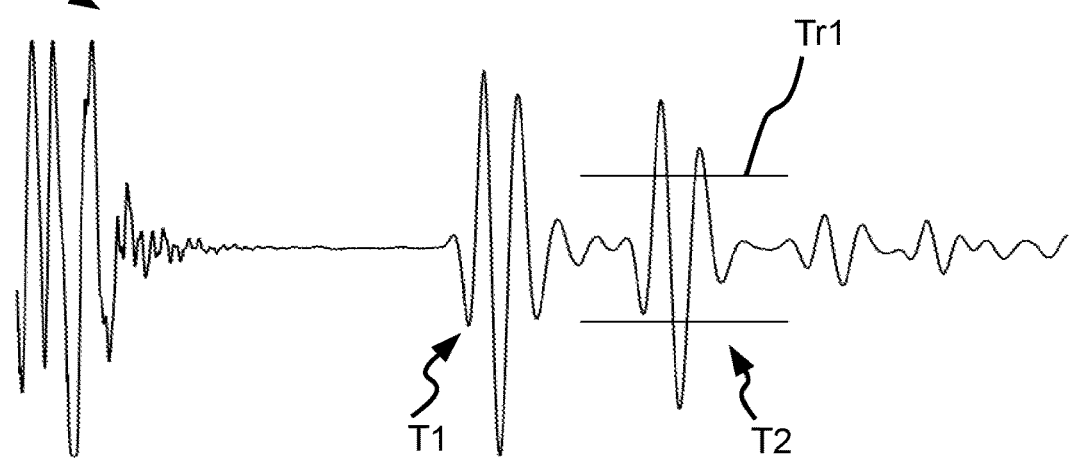

FIGS. 7*a-b* illustrates the same setup as illustrated in FIGS. 6*a-b*. However, as illustrated in FIGS. 7*a-b* a defect 110 has formed. Such defects, e.g. cracks, may form at the interface between materials, such as between the material of the root region and the bushing 105, as illustrated. The defect 110 is located along the incident direction 109 and is therefore detectable by analysing the secondary acoustic signal 108.

FIG. 7*c*, shows a schematic illustration of a temporal representation of the secondary acoustic signal 108 received by the acoustical transducer 100 in the situation illustrated in FIGS. 7*a-b*. The secondary acoustic signal 108 as illustrated in FIG. 7*c*, shows at T1 the initial echo originating from the transition between the acoustical transducer 100 and the root region 30. Furthermore, an echo is seen at T2 caused by the material transition between the material of the root region 30 and the defect 110. As illustrated, the amplitude of the echo at T2 is quite different than the amplitude at T2 when no defect was present, as illustrated in FIG. 6*c*. The amplitude of the echo at T2 in the situation in FIG. 7*c* passed the first amplitude threshold Tr1. Thereby it may be determined that a defect 110 has emerged between the bushing and the material of the root region 30. For example, the defect may be determined based on a comparison between initial measurements, e.g. as illustrated in FIGS. 6*a-c*, and the measurements as illustrated in FIGS. 7*a-c*.

The presence of a defect 110 may be evaluated and/or determined based on one or more signal parameters and/or a combination of signal parameters. For example, the one or more signal parameters may include a primary signal parameter indicative of a dissimilarity between the secondary acoustic signal 108 and a reference signal, such as an initial secondary acoustic signal, e.g. measured while no defect was present, such as the secondary acoustic signal 108 as illustrated in FIG. 6*a-c*.

Alternatively or additionally, the one or more signal parameters may include a secondary signal parameter indicative of a peak amplitude of the secondary acoustic signal 108 within a time frame T2, a peak amplitude above a first amplitude threshold Tr1 may be used to indicate the presence of a defect. Also, if the peak amplitude is increasing over time, this may further be used to indicate the presence of a defect.

Alternatively or additionally, the one or more signal parameters may include a tertiary signal parameter indicative of a similarity between a reference waveform, e.g. resembling the detected first reflection at T1 originating from the surface of the structure, and a detected reflection within a time frame T2. For example, the more similar the two reflections are the more likely it is that a defect is present. As seen in FIG. 7*c*, the reflection at T2 has the same appearance as the reflection at T1, i.e. indicating presence of a defect.

Alternatively or additionally, the one or more signal parameters may include a quaternary signal parameter indicative of the time of the peak amplitude within a time frame T2. Experiments have shown that the peak of the secondary acoustic signal 108 shifts to the left, i.e. appear earlier, as a defect is emerging. Hence, a left-shifting peak amplitude may be used as an indicator for the presence of a defect.

Alternatively or additionally, the one or more signal parameters may include a quinary signal parameter indicative of the time of a detected occurrence of a reference waveform, e.g. resembling the detected first reflection at T1 originating from the surface of the structure, within a time frame T2. Experiments have shown that the occurrence of the reference waveform shifts to the left, i.e. appear earlier, as a defect is emerging. Hence, a left-shifting occurrence of the reference waveform may be used as an indicator for the presence of a defect.

Figure 8:
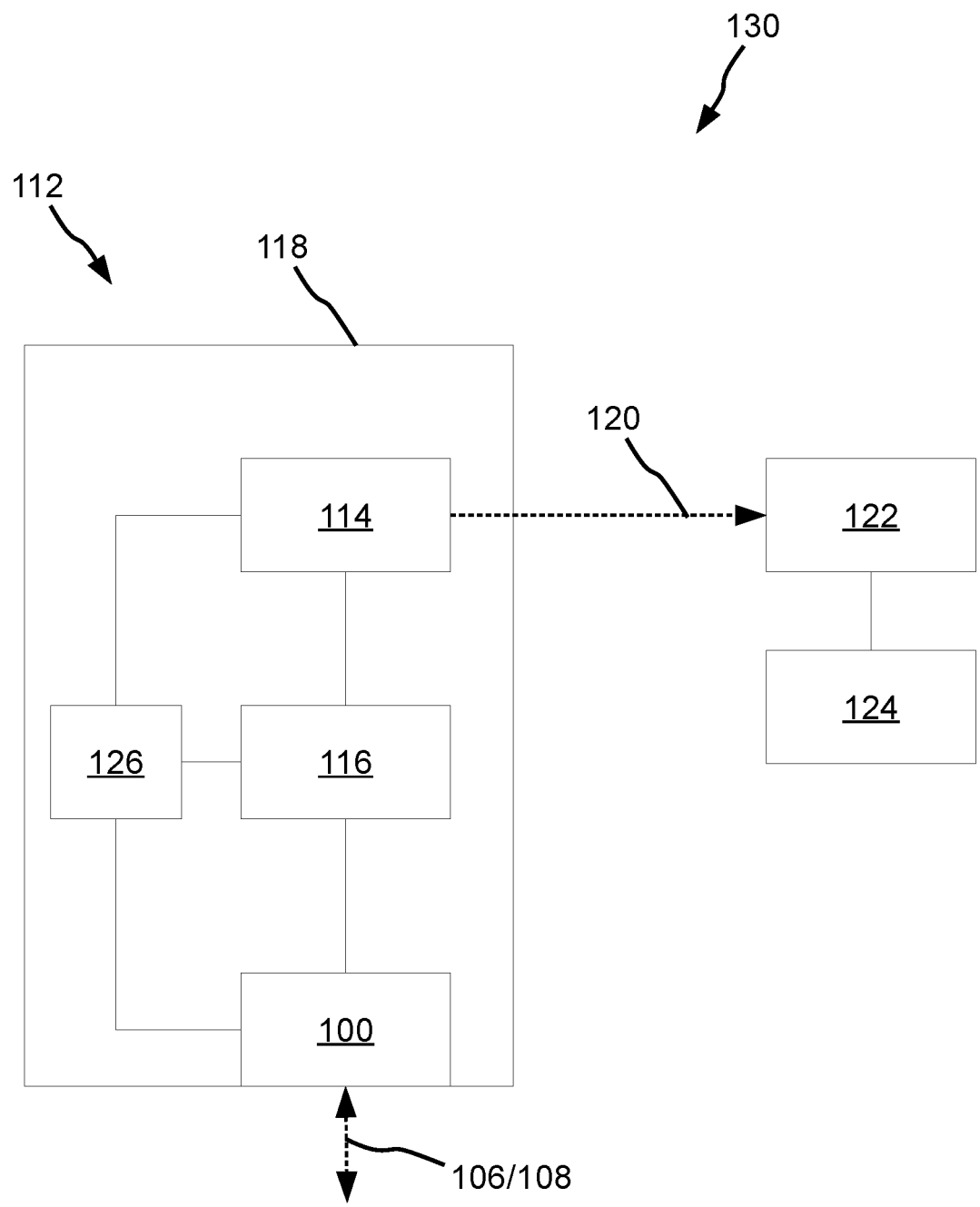
FIG. 8 is a schematic block diagram of a system.

FIG. 8 is a schematic block diagram of a system 130 for detecting defects in a structure of a wind turbine blade. The system comprises a transducer unit 112 configured to be provided on the wind turbine blade. For example, the transducer unit 112 may be fastened to the structure of the wind turbine blade.

The transducer unit 112 comprises an acoustical transducer 100, such as the acoustical transducer as described with respect to other figures. The acoustical transducer 100 is configured to emit a primary acoustic signal 106 and receive a secondary acoustic signal 108.

The transducer unit 112 comprises a processing unit 116 coupled to the acoustical transducer 100. The transducer unit 112 comprises a wireless transmitter (may be implemented as a wireless transceiver) 114 coupled to acoustical transducer, e.g. via the processing unit 116. The processing unit 116 is configured to receive a transducer signal indicative of the secondary acoustic signal 108. The wireless transmitter 114 is configured to wirelessly transmit a wireless signal 120 indicative of the secondary acoustic signal 108 to a wireless receiver 122. The processing unit 116 may be configured to forward the transducer signal to the wireless transmitter 114 and cause the wireless transmitter 114 to wirelessly transmit the wireless signal 120 to the wireless receiver 122.

The transducer unit 112 may comprise a battery configured to power the wireless transmitter 114, the processing unit 116 and the acoustical transducer 100.

The transducer unit 112 may comprise a housing 118 accommodating the wireless transmitter 114, the processing unit 116, the acoustical transducer 100 and the battery.

The wireless receiver 122 may be located in the nacelle of the wind turbine or on the ground in the vicinity of the wind turbine. The wireless receiver 122 may be couple to a control unit 124 configured to analyse and evaluate the received data. For example, the control unit 124 may analyse the secondary acoustic signal to obtain signal parameters and/or evaluate presence of defects based on the signal parameters.

Figure 9:
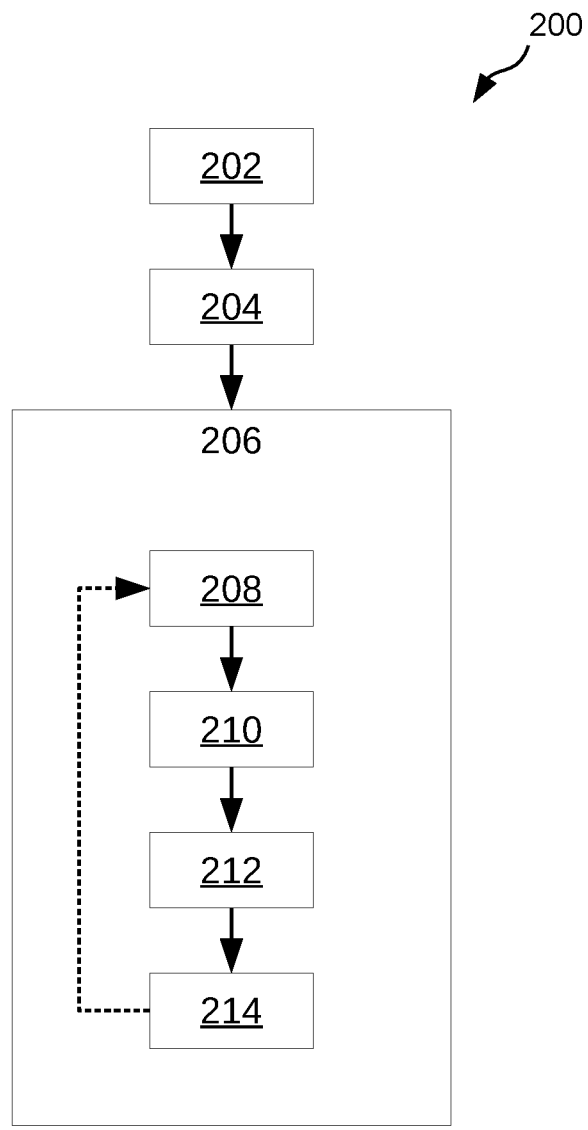
FIG. 9 is a block diagram of an exemplary method.

FIG. 9 is a block diagram of an exemplary method 200, e.g. for detecting defects, such as concealed and/or emerging defects, in a structure of a wind turbine blade. For example, the structure may be a root region of the wind turbine blade as described with respect to other figures. However, the method 200 may be applied for detecting defects in other structures of the wind turbine.

The method 200 comprises fastening 202 a first acoustical transducer, such as an acoustical transducer 100 as described with respect to other figures, e.g. FIGS. 4-8, to a first area of a surface, such as an outer surface, of the structure. For example, the first acoustical transducer may be an ultrasound transducer.

The method 200 comprises attaching 204 the wind turbine blade to a hub of a wind turbine and operating 206 the wind turbine with the attached blade. It is noted, that acoustical transducers may be fastened to several or all of the blades of the wind turbine.

While operating 206 the wind turbine, the method 200 comprises emitting 208 by the first acoustical transducer a first primary acoustic signal through the surface of the structure and into the structure, e.g. in a first incident direction. The first incident direction may be perpendicular to the first surface on which the first acoustical transducer is fastened.

While operating 206 the wind turbine, the method 200 comprises receiving 210 by the first acoustical transducer a first secondary acoustic signal indicative of an echo of the first primary acoustic signal.

The method 200 comprises analysing 212 the first secondary acoustic signal to obtain one or more first signal parameters and evaluating 214 presence of a first defect in the structure, e.g. along the first incident direction, based on the one or more signal parameters. As indicated, analysing 212 the secondary acoustic signal and evaluating 214 presence of defects in the structure may be performed also while the wind turbine is operating 206.

As indicated by the dashed arrow, emitting 208 the first primary acoustic signal, receiving 210 the first secondary acoustic signal, analysing 212 the secondary acoustic signal and evaluating 214 presence of defects in the structure may be repeatedly performed, e.g. separated by a first time difference. For example, after evaluating 214 presence of defects, the method may comprise again emitting 208 the first primary acoustic signal. The method 200 may be configured to start a sequence, e.g. to emit 208 the first primary acoustic signal at predefined time intervals, e.g. separated by the first time difference, e.g. every 73 seconds. The first time difference may be selected such that the first time difference is not divisible by the full rotation time of the wind turbine, such as to provide measurements on the wind turbine blade at different positions in the rotation cycle.

Figure 10:
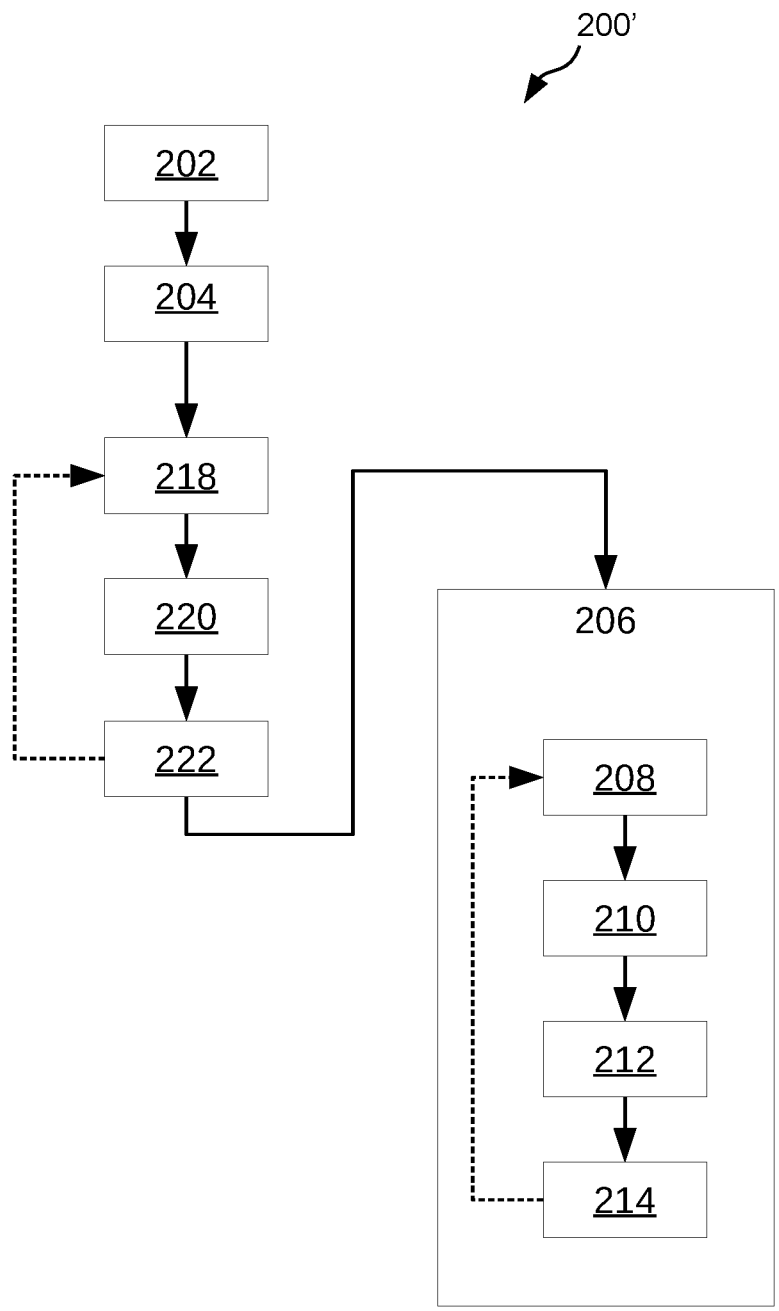
FIG. 10 is a block diagram of an exemplary method.

FIG. 10 is a block diagram of an exemplary method 200', e.g. for detecting defects, such as concealed and/or emerging defects, in a structure of a wind turbine blade. The method 200' comprises the same steps as the method 200 of FIG. 9. However, the method 200' additionally comprises initially obtaining reference measurements prior to providing measurements specifically for detecting defects. Thus, the method 200' additionally comprises, e.g. prior to operating the wind turbine 206 as illustrated, emitting 218 by the first acoustical transducer an initial first primary acoustic signal through the surface of the structure and into the structure and receiving 220 by the first acoustical transducer an initial first secondary acoustic signal indicative of an echo of the initial first primary acoustic signal. The method 200' also comprises determining 222 a reference measurement based on the initial first secondary acoustic signal. After having determined 222 a reference measurement, the method 200' may continue to operate 206 the wind turbine and provide measurements for detecting defects, as explained with respect to FIG. 9. In another exemplary method, the reference measurements may be provided after initiating operation 206 of the wind turbine, e.g. for one or more initial cycles.

Figure 11:
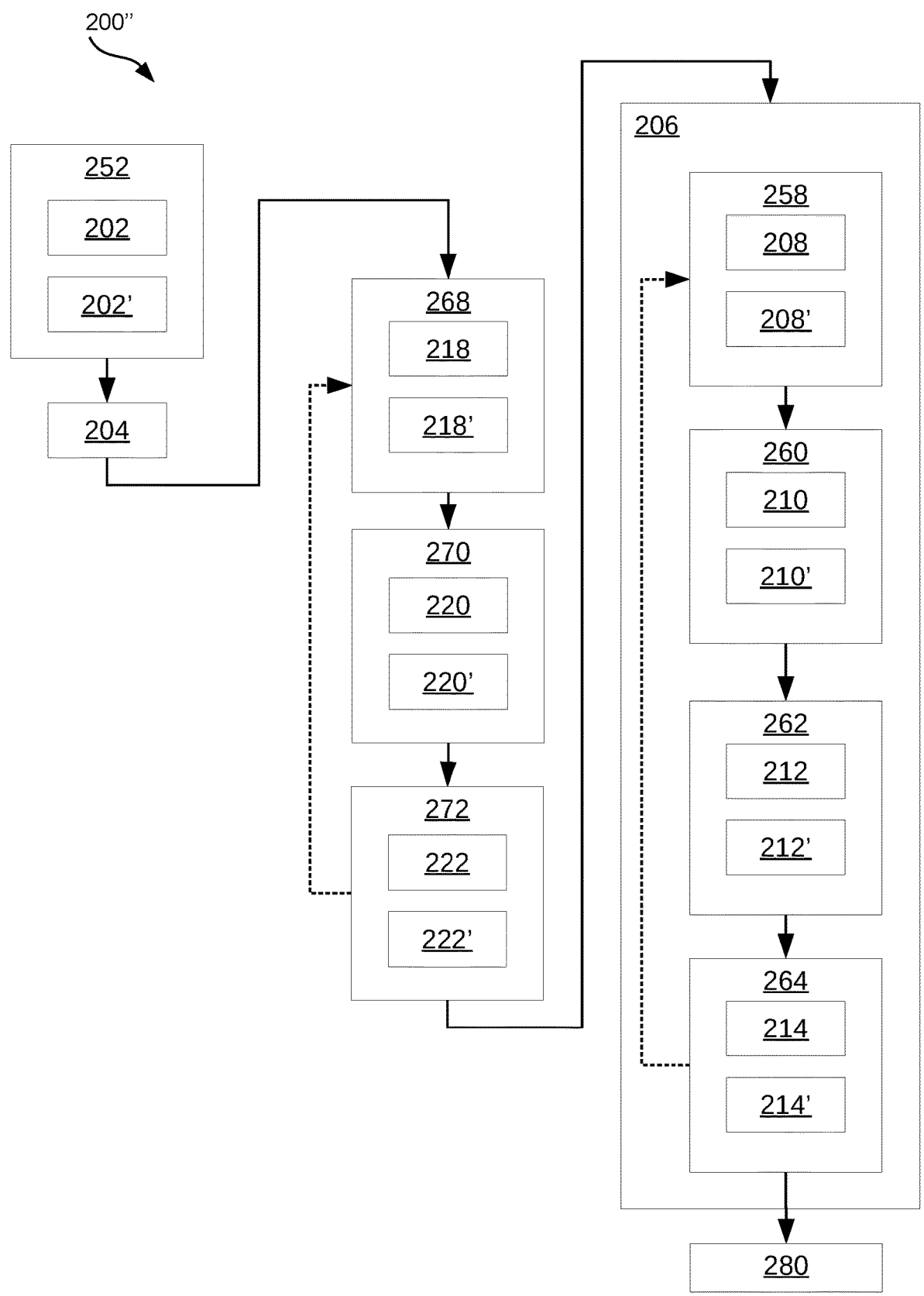
FIG. 11 is a block diagram of an exemplary method.

FIG. 11 is a block diagram of an exemplary method 200", e.g. for detecting defects, such as concealed and/or emerging defects, in a structure of a wind turbine blade. The method 200" differs from the methods 200, 200' of FIGS. 9 and 10 in that a plurality of acoustical transducers are applied to the wind turbine blade.

The method 200" comprises fastening 252 a plurality of acoustical transducers to the surface of the structure, including fastening 202 the first acoustical transducer to the first area of the surface of the structure and fastening 202' a second acoustical transducer to a second area of the surface of the structure.

While operating 206 the wind turbine, the method 200" comprises emitting 258 by the plurality of acoustical transducers primary acoustic signals, including emitting 208 by the first acoustical transducer the first primary acoustic signal through the surface of the structure and into the structure and emitting 208' by the second acoustical transducer a second primary acoustic signal through the surface of the structure and into the structure.

While operating 206 the wind turbine, the method 200" comprises receiving 260 by the plurality of acoustical transducers secondary acoustic signals indicative of echoes of the primary acoustic signals, including receiving 210 by the first acoustical transducer the first secondary acoustic signal indicative of an echo of the first primary acoustic signal and receiving 210' by the second acoustical transducer a second secondary acoustic signal indicative of an echo of the second primary acoustic signal.

The method 200" comprises analysing 262 the secondary acoustic signals to obtain signal parameters, including analysing 212 the first secondary acoustic signal to obtain first signal parameters and analysing 212' the second secondary acoustic signal to obtain second signal parameters.

The method 200" comprises evaluating 264 presence of defects in the structure based on the signal parameters, including evaluating 214 presence of first defects in the structure based on the first signal parameters and evaluating 214' presence of second defects in the structure based on the second signal parameters.

The method 200" may further comprise halting 280 operating of the wind turbine, e.g. If presence of one or more defects are determined. For example, halting 280 operation of the wind turbine may be subject to the number of defects determined being more than a predetermined threshold. For example, in accordance with the determined 264 defects being more than or equal to a threshold number of defects halting 280 operation of the wind turbine, and in accordance with the determined 264 defects being less than the threshold number of defects continue operation 206 of the wind turbine.

The method 200" may further comprise, as also described with respect to FIG. 10, initially obtaining reference measurements prior to providing measurements specifically for detecting defects.

Thus, the method 200" may comprise, e.g. prior to operating 206 the wind turbine, emitting 268 by the plurality of acoustical transducers initial primary acoustic signals, including emitting 268 by the first acoustical transducer the initial first primary acoustic signal through the surface of the structure and into the structure and emitting 268' by the second acoustical transducer an initial second primary acoustic signal through the surface of the structure and into the structure, and receiving 270 by the plurality of acoustical transducers initial secondary acoustic signals indicative of echoes of the initial primary acoustic signals, including receiving 220 by the first acoustical transducer the initial first secondary acoustic signal indicative of an echo of the initial first primary acoustic signal and receiving 220' by the second acoustical transducer an initial second secondary acoustic signal indicative of an echo of the initial second primary acoustic signal. The method 200" also comprises determining 272 reference measurements based on the initial secondary acoustic signals, including determining 222 a first reference measurement based on the initial first secondary acoustic signals and determining 222 a second reference measurement based on the initial second secondary acoustic signals.

The invention has been described with reference to preferred embodiments. However, the scope of the invention is not limited to the illustrated embodiments, and alterations and modifications can be carried out without deviating from the scope of the invention.

Exemplary embodiments are set out in the following items:

1. A method for detecting concealed emerging defects in a structure of a wind turbine blade, the method comprising:
    fastening a first acoustical transducer to a first area of a surface of the structure;
    attaching the wind turbine blade to a hub of a wind turbine;
    operating the wind turbine and while operating the wind turbine:
        emitting by the first acoustical transducer a first primary acoustic signal through the surface of the structure and into the structure; and
        receiving by the first acoustical transducer a first secondary acoustic signal indicative of an echo of the first primary acoustic signal;
    analysing the first secondary acoustic signal to obtain one or more first signal parameters; and
    evaluating presence of a first defect in the structure based on the one or more signal parameters.
2. Method according to item 1, wherein analysing the first secondary acoustic signal and/or evaluating presence of a first defect in the structure is performed while the wind turbine is operating.
3. Method according to any of the preceding items, wherein emitting the first primary acoustic signal, receiving the first secondary acoustic signal, analysing the secondary acoustic signal and/or evaluating presence of defects in the structure is repeatedly performed separated by a first time difference.
4. Method according to Item 3, wherein the first time difference is between 10-600 seconds, such as between 30-300 seconds, such as between 60-100 seconds.
5. Method according to Item 3, wherein the first time difference is between 12-72 hours, such as between 12-48 hours, such as between 12-36 hours, such as 24 hours.
6. Method according to any of items 3-5, wherein when the wind turbine is operating within limits of rated rotational speed of the wind turbine the hub of the wind turbine rotates one revolution during a full rotation time, and wherein the first time difference is selected such that the first time difference is not divisible by the full rotation time.
7. Method according to any of the preceding items, wherein the first primary acoustic signal is an ultrasound signal and wherein the first primary acoustic signal has a frequency between 100 kHz and 1 MHz, such as between 300 kHz and 700 kHz, such as 500 kHz.
8. Method according to any of the preceding items, wherein fastening the first acoustical transducer to the surface of the structure comprises fastening the first acoustical transducer to an outer surface of the structure.
9. Method according to any of the preceding items comprising:
    prior to operating the wind turbine or while operating the wind turbine for one or more initial cycles:
        emitting by the first acoustical transducer an initial first primary acoustic signal through the surface of the structure and into the structure; and
        receiving by the first acoustical transducer an initial first secondary acoustic signal indicative of an echo of the initial first primary acoustic signal;
    determining a reference measurement based on the initial first secondary acoustic signal.
10. Method according to the preceding item, wherein the one or more first signal parameters, includes a first primary signal parameter, the first primary signal parameter being indicative of a dissimilarity between the first secondary acoustic signal and the initial first secondary acoustic signal.
11. Method according to any of the preceding items, wherein the one or more first signal parameters, includes a first secondary signal parameter, the first secondary signal parameter being indicative of a peak amplitude of the first secondary acoustic signal within a secondary time frame.
12. Method according to any of the preceding items, wherein the one or more first signal parameters, includes a first tertiary signal parameter, the first tertiary signal parameter being indicative of a similarity between a detected first reflection originating from the surface of the structure and a detected reflection within a tertiary time frame.
13. Method according to any of the preceding items, wherein the one or more first signal parameters, includes a first quaternary signal parameter, the first quaternary signal parameter is indicative of the time of a peak amplitude within a quaternary time frame.
14. Method according to any of the preceding items, wherein the one or more first signal parameters, includes a first quinary signal parameter, the first quinary signal parameter is indicative of the time of a detected occurrence of a reference waveform within a quinary time frame.
15. Method according to any of the preceding items comprising:
    fastening a plurality of acoustical transducers to the surface of the structure, including fastening the first acoustical transducer to the first area of the surface of the structure and a second acoustical transducer to a second area of the surface of the structure;
    while operating the wind turbine emitting by the plurality of acoustical transducers primary acoustic signals including the first primary acoustic signal and a second primary acoustic signal through the surface of the structure and into the structure;
    while operating the wind turbine receiving by the plurality of acoustical transducers secondary acoustic signals including the first secondary acoustic signal and a second secondary acoustic signal indicative of echoes of the primary acoustic signals;
    analysing the secondary acoustic signals to obtain signal parameters;
    evaluating presence of defects including the first defect and/or a second defect in the structure based on the signal parameters.
16. Method according to the preceding item comprising in accordance with the determined defects being more than or equal to a threshold number of defects halting operation of the wind turbine, and in accordance with the determined defects being less than the threshold number of defects continue operation of the wind turbine, wherein the threshold number of defects is two or more.
17. A wind turbine blade extending along a longitudinal axis from a root to a tip, the wind turbine blade comprising a root region, an airfoil region with the tip, the wind turbine blade comprising a pressure side, a suction side and a chord line extending between a leading edge and a trailing edge, the wind turbine blade comprising a first acoustical transducer fastened to a first area of a surface of a structure of the wind turbine blade, and wherein the first acoustical transducer is configured to, while the wind turbine blade being attached to a hub of a wind turbine and the wind turbine is operating:

emit a first primary acoustic signal through the surface of the structure and into the structure; and receive a first secondary acoustic signal indicative of an echo of the first primary acoustic signal.

18. Wind turbine blade according to item 17, wherein the wind turbine blade comprises a wireless transmitter configured to wirelessly transmit a first wireless signal indicative of the first secondary acoustic signal to a wireless receiver.

19. Wind turbine blade according to any of items 17-18, wherein the structure is the root region of the wind turbine blade, the root region comprising a plurality of embedded bushings configured for mechanically coupling the wind turbine blade to the hub of the wind turbine, and wherein a first bushing of the plurality of bushings is located along a first incident direction being perpendicular to the first area.

20. Wind turbine blade according to item 19 comprising a plurality of acoustical transducers including the first acoustical transducer, each of the plurality of acoustical transducers being fastened to a respective area of the surface of the root region, and wherein a respective bushing of the plurality of embedded bushings is located along a respective incident direction perpendicular to each of the respective areas.

21. Wind turbine blade according to item 20, wherein the number of the plurality of acoustical transducers are less than the number of the plurality of embedded bushings, e.g. the number of the plurality of acoustical transducers may be between 5 and 10 and the number of the plurality of embedded bushings may be more than 50.

22. Wind turbine blade according to any of items 20-21, wherein a majority of the plurality of acoustical transducers are fastened to the pressure side of the wind turbine blade.

23. A method for detecting concealed emerging defects in a structure, the method comprising:

fastening a first acoustical transducer to a first area of a surface of the structure;

using the structure for its intended purpose and while using the structure:

emitting by the first acoustical transducer a first primary acoustic signal through the surface of the structure and into the structure; and receiving by the first acoustical transducer a first secondary acoustic signal indicative of an echo of the first primary acoustic signal;

analysing the first secondary acoustic signal to obtain one or more first signal parameters; and evaluating presence of a first defect in the structure based on the one or more signal parameters.

24. Method according to item 23, wherein the structure is a structure of a wind turbine blade, and wherein the method comprises attaching the wind turbine blade to a hub of a wind turbine, and wherein using the structure for its intended purpose includes operating the wind turbine with the attached wind turbine blade.

25. Method according to any of items 23 or 24, wherein analysing the first secondary acoustic signal and/or evaluating presence of a first defect in the structure is performed while using the structure.

26. Method according to any of items 23-25, wherein emitting the first primary acoustic signal, receiving the first secondary acoustic signal, analysing the secondary acoustic signal and/or evaluating presence of defects in the structure is repeatedly performed separated by a first time difference.

27. Method according to item 26, wherein the first time difference is between 10-600 seconds, such as between 30-300 seconds, such as between 60-100 seconds.

28. Method according to item 26, wherein the first time difference is between 12-72 hours, such as between 12-48 hours, such as between 12-36 hours, such as 24 hours.

29. Method according to any of items 26-28 as dependent on item 24, wherein when the wind turbine is operating within limits of rated rotational speed of the wind turbine the hub of the wind turbine rotates one revolution during a full rotation time, and wherein the first time difference is selected such that the first time difference is not divisible by the full rotation time.

30. Method according to any of items 23-29, wherein the first primary acoustic signal is an ultrasound signal and wherein the first primary acoustic signal has a frequency between 100 kHz and 1 MHz, such as between 300 kHz and 700 kHz, such as 500 kHz.

31. Method according to any of items 23-30, wherein fastening the first acoustical transducer to the surface of the structure comprises fastening the first acoustical transducer to an outer surface of the structure.

32. Method according to any of items 23-31 comprising:

prior to using the structure or while using the structure for an initial time period:

emitting by the first acoustical transducer an initial first primary acoustic signal through the surface of the structure and into the structure; and receiving by the first acoustical transducer an initial first secondary acoustic signal indicative of an echo of the initial first primary acoustic signal;

determining a reference measurement based on the initial first secondary acoustic signal.

33. Method according to Item 32, wherein the one or more first signal parameters, includes a first primary signal parameter, the first primary signal parameter being indicative of a dissimilarity between the first secondary acoustic signal and the initial first secondary acoustic signal.

34. Method according to of any items 23-33, wherein the one or more first signal parameters, includes a first secondary signal parameter, the first secondary signal parameter being indicative of a peak amplitude of the first secondary acoustic signal within a secondary time frame.

35. Method according to any of items 23-34, wherein the one or more first signal parameters, includes a first tertiary signal parameter, the first tertiary signal parameter being indicative of a similarity between a detected first reflection originating from the surface of the structure and a detected reflection within a tertiary time frame.

36. Method according to any of items 23-35, wherein the one or more first signal parameters, includes a first quaternary signal parameter, the first quaternary signal parameter is indicative of the time of a peak amplitude within a quaternary time frame.
37. Method according to any of items 23-36, wherein the one or more first signal parameters, includes a first quinary signal parameter, the first quinary signal parameter is indicative of the time of a detected occurrence of a reference waveform within a quinary time frame.
38. Method according to any of items 23-37 comprising:
   fastening a plurality of acoustical transducers to the surface of the structure, including fastening the first acoustical transducer to the first area of the surface of the structure and a second acoustical transducer to a second area of the surface of the structure;
   while using the structure emitting by the plurality of acoustical transducers primary acoustic signals including the first primary acoustic signal and a second primary acoustic signal through the surface of the structure and into the structure;
   while using the structure receiving by the plurality of acoustical transducers secondary acoustic signals including the first secondary acoustic signal and a second secondary acoustic signal indicative of echoes of the primary acoustic signals;
   analysing the secondary acoustic signals to obtain signal parameters;
   evaluating presence of defects including the first defect and/or a second defect in the structure based on the signal parameters.
39. Method according to item 38 comprising in accordance with the determined defects being more than or equal to a threshold number of defects halting use of the structure, and in accordance with the determined defects being less than the threshold number of defects continue use of the structure, wherein the threshold number of defects is two or more.
40. A structure comprising a first acoustical transducer fastened to a first area of a surface of the structure, and wherein the first acoustical transducer is configured to, while the structure is in use:
   emit a first primary acoustic signal through the surface of the structure and into the structure; and
   receive a first secondary acoustic signal indicative of an echo of the first primary acoustic signal.
41. Structure according to Item 40, wherein the structure comprises a wireless transmitter configured to wirelessly transmit a first wireless signal indicative of the first secondary acoustic signal to a wireless receiver.
42. A wind turbine blade extending along a longitudinal axis from a root to a tip, the wind turbine blade comprising a root region, an airfoil region with the tip, the wind turbine blade comprising a pressure side, a suction side and a chord line extending between a leading edge and a trailing edge, the wind turbine blade comprising a structure according to any of items 40-41, wherein the structure is the root region of the wind turbine blade, the root region comprising a plurality of embedded bushings configured for mechanically coupling the wind turbine blade to the hub of the wind turbine, and wherein a first bushing of the plurality of bushings is located along a first incident direction being perpendicular to the first area.
43. Wind turbine blade according to Item 42 comprising a plurality of acoustical transducers including the first acoustical transducer, each of the plurality of acoustical transducers being fastened to a respective area of the surface of the root region, and wherein a respective bushing of the plurality of embedded bushings is located along a respective incident direction perpendicular to each of the respective areas.
44. Wind turbine blade according to item 43, wherein the number of the plurality of acoustical transducers are less than the number of the plurality of embedded bushings, e.g. the number of the plurality of acoustical transducers may be between 5 and 10 and the number of the plurality of embedded bushings may be more than 50.
45. Wind turbine blade according to any of items 43-44, wherein a majority of the plurality of acoustical transducers are fastened to the pressure side of the wind turbine blade.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
38 chord line
40 shoulder
42 shear web or spar side
44 first spar cap
46 spar cap
100 acoustical transducer
102 area of surface
104 surface of structure
105 bushing
106 primary acoustic signal
108 secondary acoustic signal
109 incident direction
110 defect
112 transducer unit
114 wireless transmitter/transceiver
116 processing unit
118 housing
120 wireless signal
122 wireless receiver/transceiver
124 control unit
126 battery
130 system
200 method
202 fastening first acoustical transceiver
202' fastening second acoustical transceiver
204 attaching wind turbine blade to hub
206 operating wind turbine
208 emitting first primary acoustic signal
208' emitting second primary acoustic signal
210 receiving first secondary acoustic signal
210' receiving second secondary acoustic signal
212 analysing first secondary acoustic signal
212' analysing second secondary acoustic signal 214 evaluating presence of first defect
214' evaluating presence of second defect
218 emitting initial first primary acoustic signal
218' emitting initial second primary acoustic signal
220 receiving initial first secondary acoustic signal
220' receiving initial second secondary acoustic signal
222 determining reference measurement
252 fastening acoustical transceivers
258 emitting primary acoustic signals
260 receiving secondary acoustic signals
262 analysing secondary acoustic signals
264 evaluating presence of defects
268 emitting initial primary acoustic signals
270 receiving initial secondary acoustic signals
272 determining reference measurements
280 halting operation

The invention claimed is:

1. A method for detecting concealed emerging defects in a structure of a wind turbine blade, the method comprising:
fastening a first acoustical transducer to a first area of a surface of the structure;
attaching the wind turbine blade to a hub of a wind turbine:
operating the wind turbine and while operating the wind turbine:
emitting by the first acoustical transducer a first primary acoustic signal through the surface of the structure and into the structure; and
receiving by the first acoustical transducer a first secondary acoustic signal indicative of an echo of the first primary acoustic signal;
analysing the first secondary acoustic signal to obtain one or more first signal parameters; and
evaluating presence of a first defect in the structure based on the one or more signal parameters.

2. The method according to claim 1, wherein analysing the first secondary acoustic signal and/or evaluating presence of a first defect in the structure is performed while the wind turbine is operating.

3. The method according to claim 1, wherein emitting the first primary acoustic signal, receiving the first secondary acoustic signal, analysing the secondary acoustic signal and/or evaluating presence of defects in the structure is repeatedly performed separated by a first time difference.

4. The method according to claim 3, wherein the first time difference is between 10-600 seconds, such as between 30-300 seconds, such as between 60-100 seconds.

5. The method according to claim 3, wherein the first time difference is between 12-72 hours, such as between 12-48 hours, such as between 12-36 hours, such as 24 hours.

6. The method according to claim 3, wherein when the wind turbine is operating within limits of rated rotational speed of the wind turbine the hub of the wind turbine rotates one revolution during a full rotation time, and wherein the first time difference is selected such that the first time difference is not divisible by the full rotation time.

7. The method according to claim 1, wherein the first primary acoustic signal is an ultrasound signal and wherein the first primary acoustic signal has a frequency between 100 kHz and 1 MHz, such as between 300 kHz and 700 kHz, such as 500 kHz.

8. The method according to claim 1, wherein fastening the first acoustical transducer to the surface of the structure comprises fastening the first acoustical transducer to an outer surface of the structure.

9. The method according to claim 1, comprising:
prior to operating the wind turbine or while operating the wind turbine for one or more initial cycles:
emitting by the first acoustical transducer an initial first primary acoustic signal through the surface of the structure and into the structure; and
receiving by the first acoustical transducer an initial first secondary acoustic signal indicative of an echo of the initial first primary acoustic signal;
determining a reference measurement based on the initial first secondary acoustic signal.

10. The method according to claim 9, wherein the one or more first signal parameters, includes a first primary signal parameter, the first primary signal parameter being indicative of a dissimilarity between the first secondary acoustic signal and the initial first secondary acoustic signal.

11. The method according to claim 1, wherein the one or more first signal parameters, includes a first secondary signal parameter, the first secondary signal parameter being indicative of a peak amplitude of the first secondary acoustic signal within a secondary time frame.

12. The method according to claim 1, wherein the one or more first signal parameters, includes a first tertiary signal parameter, the first tertiary signal parameter being indicative of a similarity between a detected first reflection originating from the surface of the structure and a detected reflection within a tertiary time frame.

13. The method according to claim 1, wherein the one or more first signal parameters, includes a first quaternary signal parameter, the first quaternary signal parameter is indicative of the time of a peak amplitude within a quaternary time frame.

14. The method according to claim 1, wherein the one or more first signal parameters, includes a first quinary signal parameter, the first quinary signal parameter is indicative of the time of a detected occurrence of a reference waveform within a quinary time frame.

15. The method according to claim 1, comprising:
fastening a plurality of acoustical transducers to the surface of the structure, including fastening the first acoustical transducer to the first area of the surface of the structure and a second acoustical transducer to a second area of the surface of the structure;
while operating the wind turbine emitting by the plurality of acoustical transducers primary acoustic signals including the first primary acoustic signal and a second primary acoustic signal through the surface of the structure and into the structure;
while operating the wind turbine receiving by the plurality of acoustical transducers secondary acoustic signals including the first secondary acoustic signal and a second secondary acoustic signal indicative of echoes of the primary acoustic signals;
analysing the secondary acoustic signals to obtain signal parameters;
evaluating presence of defects including the first defect and/or a second defect in the structure based on the signal parameters.

16. The method according to claim 15, comprising in accordance with the determined defects being more than or equal to a threshold number of defects halting operation of the wind turbine, and in accordance with the determined defects being less than the threshold number of defects continue operation of the wind turbine, wherein the threshold number of defects is two or more.

17. A wind turbine blade extending along a longitudinal axis from a root to a tip, the wind turbine blade comprising a root region, an airfoil region with the tip, the wind turbine blade comprising a pressure side, a suction side and a chord line extending between a leading edge and a trailing edge, the wind turbine blade comprising a first acoustical transducer fastened to a first area of a surface of a structure of the wind turbine blade, and wherein the first acoustical transducer is configured to, while the wind turbine blade being attached to a hub of a wind turbine and the wind turbine is operating:
  emit a first primary acoustic signal through the surface of the structure and into the structure; and
  receive a first secondary acoustic signal indicative of an echo of the first primary acoustic signal.

18. The wind turbine blade according to claim 17, wherein the wind turbine blade comprises a wireless transmitter configured to wirelessly transmit a first wireless signal indicative of the first secondary acoustic signal to a wireless receiver.

19. The wind turbine blade according to claim 17, wherein the structure is the root region of the wind turbine blade, the root region comprising a plurality of embedded bushings configured for mechanically coupling the wind turbine blade to the hub of the wind turbine, and wherein a first bushing of the plurality of bushings is located along a first incident direction being perpendicular to the first area.

20. The wind turbine blade according to claim 19, comprising a plurality of acoustical transducers including the first acoustical transducer, each of the plurality of acoustical transducers being fastened to a respective area of the surface of the root region, and wherein a respective bushing of the plurality of embedded bushings is located along a respective incident direction perpendicular to each of the respective areas.

21. The wind turbine blade according to claim 20, wherein the number of the plurality of acoustical transducers are less than the number of the plurality of embedded bushings, e.g. the number of the plurality of acoustical transducers may be between 5 and 10 and the number of the plurality of embedded bushings may be more than 50.

22. The wind turbine blade according to claim 20, wherein a majority of the plurality of acoustical transducers are fastened to the pressure side of the wind turbine blade.

* * * * *